United States Patent [19]

Koch

[11] 4,366,923

[45] Jan. 4, 1983

[54] SNAP-IN TIRE CARRIER

[76] Inventor: Harold D. Koch, Rte. 2, Box 15, Gann Valley, S. Dak. 57341

[21] Appl. No.: 251,284

[22] Filed: Apr. 6, 1981

[51] Int. Cl.³ .............................................. B62D 43/08
[52] U.S. Cl. ................................................. 224/42.24
[58] Field of Search ...................... 224/42.24, 42.12; 220/22.1, 22.5

[56] References Cited

U.S. PATENT DOCUMENTS

| 1,585,436 | 5/1926 | Swenson | 224/42.24 |
| 3,204,840 | 9/1965 | Bowen | 224/42.24 |
| 3,613,972 | 10/1971 | Daughetee | 224/42.24 |
| 4,116,373 | 9/1978 | Bryngelson | 224/42.24 |

Primary Examiner—Steven M. Pollard
Assistant Examiner—David Voorhees
Attorney, Agent, or Firm—Kerkam, Stowell, Kondracki & Clarke

[57] ABSTRACT

An assembly for snapping a spare tire to the inside wall of a pick-up truck is disclosed. An angle brace extends from a base plate in contact with the truck floor to a spring plate in contact with the body flange. An L-rod extends inwardly from the angle brace and attaches to a tire clamp and adjustable ring pieces to secure the tire.

8 Claims, 3 Drawing Figures

SNAP-IN TIRE CARRIER

BACKGROUND OF THE INVENTION

This invention relates to devices for holding spare tires firmly in place in a vehicle. More specifically, this invention relates to a snap-in tire carrier for holding spare tires on the inside of a side wall of a pick-up truck bed.

The prior art has included numerous devices for carrying spare tires in vehicles. In particular, several of these prior art devices have been used for mounting spare tires on the inside wall of pick-up truck beds. Although many of these prior art devices have been useful, they have generally been subject to one or more disadvantages. In particular, they have often required drilling or otherwise permanently modifying the side wall or bed of the pick-up truck. Additionally, they have often been of rather complex construction with a large number of parts, each of which is subject to being lost. Other of these devices have been limited to particular tire sizes and/or particular sizes for the hub or pilot hole in the tire.

The following patents are believed of relevance in showing various prior art tire carriers:
U.S. Pat. No. 1,585,436—Swenson
U.S. Pat. No. 3,204,840—Bowen
U.S. Pat. No. 3,613,972—Daughhetee
U.S. Pat. No. 4,116,373—Bryngelson Accordingly, it is an object of the present invention to provide a snap-in tire carrier for pick-up truck beds wherein no holes or other permanent modifications have to be made to the side wall or bed of the pick-up truck.

A further object of the present invention is to provide a tire carrier which is simple in construction and has relatively few parts.

Another object of the present invention is to provide a tire carrier which will readily accommodate various tire sizes in various sizes of hub holes.

SUMMARY OF THE INVENTION

These and other objects of the present invention are accomplished by a snap-in tire carrier which holds a spare tire along a side wall of the bed section of a pick-up truck. The tire carrier includes a brace having an upper end and a lower end and adapted to extend generally between the floor of the bed section of the pick-up truck and the body flange of the side wall. A spring plate at the upper end of the brace is operative to secure the brace in an upright position wedge generally between the floor of the bed section of the pick-up truck and the body flange. An elongate transverse piece, preferably an L-rod, extends inwardly from the brace. A securing piece is adapted to attach to the elongate transverse piece so as to secure a tire in an upright position in between the securing piece and the side wall of the bed section of the pick-up truck. The securing piece is preferably a tire-rim clamp attached to a ring, the ring being adjustable to accommodate various size hub holes. An L-clamp is adapted to attach to the brace adjacent its upper end such that the L-clamp and the brace are secured to the lip of the body flange in between.

BRIEF DESCRIPTION OF THE DRAWINGS

Other objects, advantages and features of the present invention will be more readily appreciated when taken in conjunction with the drawings, in which.

DETAILED DESCRIPTION

Figure 1:
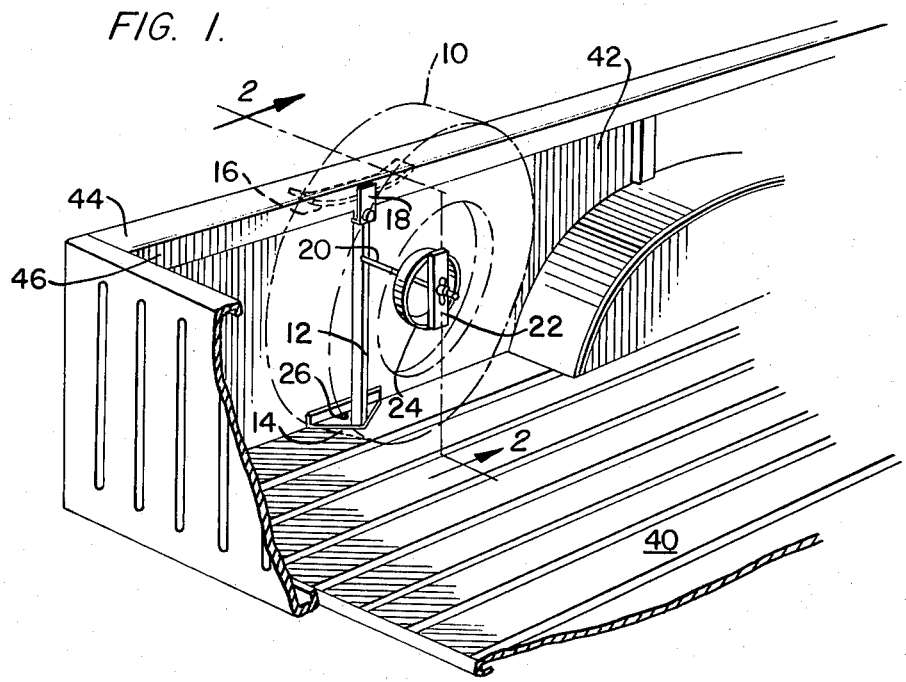
FIG. 1 is a perspective view of the present invention when mounted in the bed of a pick-up truck.
Figure 2:
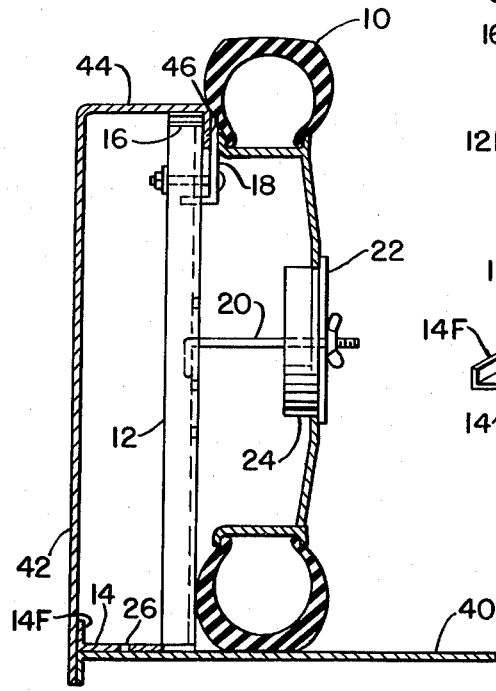
FIG. 2 is a cross sectional view taken along lines 2—2 of FIG. 1.
Figure 3:
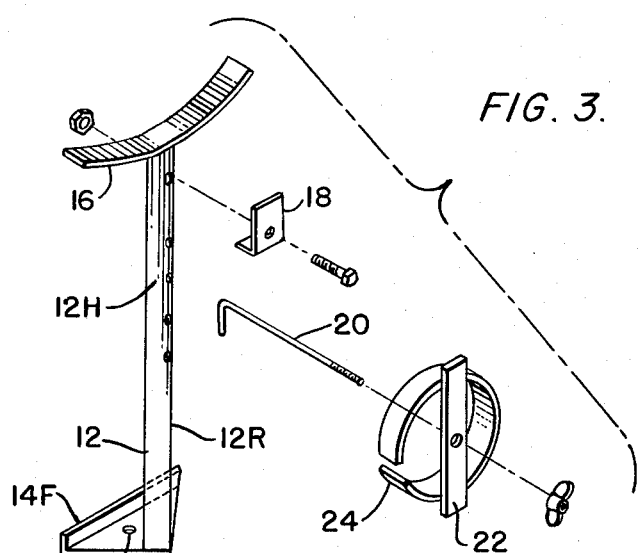
FIG. 3 is an exploded perspective view of the present invention.

Referring now to the drawings wherein like reference numerals designate like parts throughout the several views, a conventional truck bed 40 having side wall 42, body flange 44, and lip flange 46 is shown. The present invention includes a brace 12 having an upper end and a lower end and adapted to extend generally between the bed floor 40 and the body flange 44. As shown, the brace 12 is an angle brace having a ridge 12R with a series of holes 12H along the ridge. A base plate 14 is permanently affixed as by welding to the lower end of angle brace 12. The base plate 14 is generally planar and triangular as shown, but includes an upturned flange 14F for bracing against side wall 42 as best shown in FIG. 2. Additionally, the planar part of base plate 14 may include a hole 26 useful for pinning base plate 14 to the bed floor 40 although the use of hole 26 is not at all necessary for the operability of the present invention.

At the upper end of angle brace 12 is a spring plate 16, preferably made of metal. Spring plate 16, which is preferably either permanently affixed as by welding to angle brace 12 or of unitary construction therewith, operates as a spring securing the brace 12 in an upright position generally between the floor 40 and the body flange 44. Removably affixed to the angle brace 12 is a L-clamp used for clamping the lip flange 46 securely in between angle brace 12 and the L-clamp 18 itself. The L-clamp 18 may be mounted by bolting through one of the holes 12H on the ridge 12R of the angle brace 12.

An L-rod 20 constitutes an elongate transverse piece which may be attached to the brace 12 by extending its short leg through one of the holes 12H such that the short leg of L-rod 20 lies in the channel or trough on the backside of angle brace 12 corresponding to the ridge 12R on the front side of the angle brace 12. The L-rod 20 is threaded at its end as shown such that tire clamp 22 may be secured by a wing nut or other type of nut. Attached to tire clamp 22 is a ring 24 which may be welded or otherwise affixed at one end of tire clamp 22. The ring 24 is expandable and compressable to different diameters, thereby allowing the ring 24 to fit in various size hub holes. The ring 24 is preferably made of a relatively pliable sheet metal material.

As one will readily appreciate, the present invention is advantageous in that the assembly is relatively simple and straight forward in addition to the relative simplicity of the manufacture of the present invention. In particular, the angle brace assembly including angle brace 12, base plate 14 and spring plate 16 is attached to the inside wall of the pick-up truck by slipping spring plate 16 under the body flange 44 and between the side wall 42 and lip flange 46. The base plate 14 is then pushed against the inside of side wall 42, spring plate 16 thereby securing the brace 12 in an upright position generally between the bed floor 40 and the body flange 44. The L-clamp 18 is then secured to angle brace 12 by a bolt which may extend through one of the holes 12H in ridge 12R of angle brace 12. Lip flange 46 will thus be clamped in between brace 12 and L-clamp 18. The short end of L-rod 20 is then placed through one of the holes 12H in the ridge 12R of brace 12 such that the short end rests on the inside of the channel or trough on the back side of angle brace 12 and the long threaded leg of L-rod 20 extends inwardly from the brace 12. A spare tire 10 is placed into position such that the long leg of L-rod 20 extends through the pilot or hub hole of the tire rim. The tire clamp 22 and ring 24, which are preferably welded together, are then placed on the L-rod 20 so that the ring 24 fits into the hub hole and the clamp 22 is against the outer edges. A wing nut is then fastened to the L-rod 20, thereby securing tire clamp 22 and tire 10 in between the tire clamp 22 and the lip flange 26.

It will thus be seen that the present invention provides a device for supporting a spare tire on the inside wall of a truck bed without the necessity of drilling or otherwise permanently changing the truck bed itself. As mentioned, hole 26 may be included in base plate 14 for pinning base plate 14 into place relative to truck bed 40 although the operation of spring plate 16 makes this an optional and not a necessary step. Further, it will be apparent that the present invention may be easily removed and relocated. Note also that the assembly clamp comprising tire clamp 22 and ring 24 is designed to force the base plate 14 against the inside of side wall 42 by moment action. Further, this operation pulls the spring plate 16 against the inside or lip flange 46. Thus, not only does spring plate 16 wedge the brace 12 between body flange 44 and bed 40, but the operation of L-rod 20, tire clamp 22 and ring 24 serves to apply a clock-wise (as seen in FIG. 2) moment to the assembly, thereby maintaining the tire carrier in position.

Although a particular embodiment of the present invention has been described, it will be really appreciated that various modifications may be made therein without departing from the spirit of the present invention. Accordingly, it is to be understood that the scope of the present invention should be determined by reference to the claims appended hereto.

I claim:
1. A tire carrier for holding a spare tire along a side wall of the bed section of a pick-up truck, said tire carrier comprising:
   (a) a brace having an upper end and a lower end and adapted to extend generally between the floor of the bed section of the pick-up truck and the body flange of the side wall;
   (b) a spring operative to secure said brace in an upright position generally between the floor of the bed section of the pick-up truck and the body flange of the side wall;
   (c) an elongate transverse piece for attachment to said brace and to extend inwardly from said brace; and
   (d) a securing piece adapted to attach to said elongate transverse piece so as to secure a tire in an upright position in between said securing piece and the side wall of the bed section of the pick-up truck.
2. The invention of claim 1 wherein said spring is a spring plate at one of said ends of said brace.
3. The invention of claim 1 or 2 further comprising an L-clamp adapted to attach to said brace adjacent its upper end whereby the L-clamp and the brace are secured with the lip of the body flange in between.
4. The invention of claim 2 wherein said securing piece is a tire-rim clamp attached to a ring, said ring being adjustable to accommodate various size hub holes.
5. The invention of claim 2 further comprising a base plate at the end of said brace opposite said spring plate.
6. The invention of claim 5 wherein said brace is an angle brace having a ridge with at least one hole for receiving said elongate transverse piece.
7. The invention of claim 6 further comprising a base plate at the end of said brace opposite said spring plate, and wherein said securing piece is a tire-rim clamp attached to a ring, said ring being adjustable to accommodate various size hub holes, and wherein said elongate transverse piece is an L-rod.
8. The invention of claim 2 or 7 wherein said spring plate is at the upper end of said brace and said spring plate is made of metal.

* * * * *